(12) United States Patent
Shaw et al.

(10) Patent No.: US 11,459,505 B1
(45) Date of Patent: *Oct. 4, 2022

(54) ENVIRONMENTALLY SAFE CONCRETE OR MORTAR ETCHING COMPOSITION AND METHODS THEREOF

(71) Applicants: Lee Shaw, Newport Beach, CA (US); Linda S. Shaw, Newport Beach, CA (US)

(72) Inventors: Lee Shaw, Newport Beach, CA (US); Linda S. Shaw, Newport Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/752,474

(22) Filed: Jan. 24, 2020

Related U.S. Application Data

(63) Continuation-in-part of application No. 16/159,942, filed on Oct. 15, 2018, now Pat. No. 10,752,837, which is a continuation-in-part of application No. 15/914,938, filed on Mar. 7, 2018, now abandoned.

(51) Int. Cl.
| | |
|---|---|
| *C09K 13/00* | (2006.01) |
| *C11D 3/00* | (2006.01) |
| *C04B 41/00* | (2006.01) |
| *C04B 41/72* | (2006.01) |
| *C04B 41/53* | (2006.01) |

(52) U.S. Cl.
CPC ........... *C09K 13/00* (2013.01); *C04B 41/009* (2013.01); *C04B 41/5353* (2013.01); *C04B 41/72* (2013.01)

(58) Field of Classification Search
None
See application file for complete search history.

(56) References Cited

U.S. PATENT DOCUMENTS

| | | | |
|---|---|---|---|
| 4,776,723 | A | 10/1988 | Brimo |
| 7,258,897 | B1 | 8/2007 | Schindler et al. |
| 8,460,399 | B2 | 6/2013 | Hertz et al. |
| 2003/0089381 | A1* | 5/2003 | Manning, Jr. ......... C11D 11/007 134/1 |
| 2005/0202989 | A1 | 9/2005 | Wilson |
| 2006/0063689 | A1 | 3/2006 | Netherton |
| 2008/0015133 | A1* | 1/2008 | Rigley ................... C11D 3/044 510/215 |
| 2008/0312119 | A1 | 12/2008 | Jaynes et al. |
| 2009/0208763 | A1 | 8/2009 | Harris |
| 2010/0184855 | A1* | 7/2010 | Bernhardt ............... A01N 25/30 514/529 |
| 2010/0210745 | A1* | 8/2010 | McDaniel ............ C09D 5/1668 521/55 |
| 2013/0319467 | A1 | 12/2013 | Mohs et al. |
| 2014/0147395 | A1* | 5/2014 | Rieth ..................... A61K 8/498 424/49 |
| 2014/0350121 | A1* | 11/2014 | Cornmell ............... A01N 31/08 514/729 |
| 2014/0378366 | A1 | 12/2014 | Silvernail et al. |
| 2015/0093425 | A1* | 4/2015 | Moore ................. C11D 3/3917 424/408 |
| 2017/0101350 | A1 | 4/2017 | Purdy et al. |
| 2017/0137639 | A1 | 5/2017 | Leenan et al. |

OTHER PUBLICATIONS

U.S. Appl. No. 15/914,938, filed Mar. 7, 2018 Advisory Action dated Mar. 11, 2019.
U.S. Appl. No. 15/914,938, filed Mar. 7, 2018 Final Rejection dated Nov. 30, 2018.
U.S. Appl. No. 15/914,938, filed Mar. 7, 2018 Non-Final Office Action dated Aug. 6, 2018.
U.S. Appl. No. 15/914,938, filed Mar. 7, 2018 Non-Final Rejection dated Apr. 25, 2019.
U.S. Appl. No. 16/159,942, filed Oct. 15, 2018 Non-Final Office Action dated Jan. 21, 2020.
U.S. Appl. No. 16/159,942, filed Oct. 15, 2018 Notice of Allowance dated Apr. 15, 2020.
U.S. Appl. No. 16/159,942, filed Oct. 15, 2018 Restriction Requirement dated May 3, 2019.

* cited by examiner

*Primary Examiner* — Shamim Ahmed
(74) *Attorney, Agent, or Firm* — Rutan & Tucker, LLP

(57) ABSTRACT

Disclosed herein is an environmentally safe etching composition and method for a concrete or mortar surface. The composition includes, in some embodiments, an aqueous solution of urea, acetic acid, a buffering agent, an anticorrosive agent, and a surfactant with no more than about 30% (w/v) urea and at least about 10% (v/v) acetic acid. The method includes, in some embodiments, obtaining the etching composition; applying the etching composition to the concrete or mortar surface at a prescribed ratio of the etching composition to the concrete or mortar surface; allowing the etching composition to stand on the concrete or mortar surface for a prescribed amount of time; and washing the concrete or mortar surface with water to produce an etched surface of the concrete or mortar.

15 Claims, 4 Drawing Sheets

Figure 1:
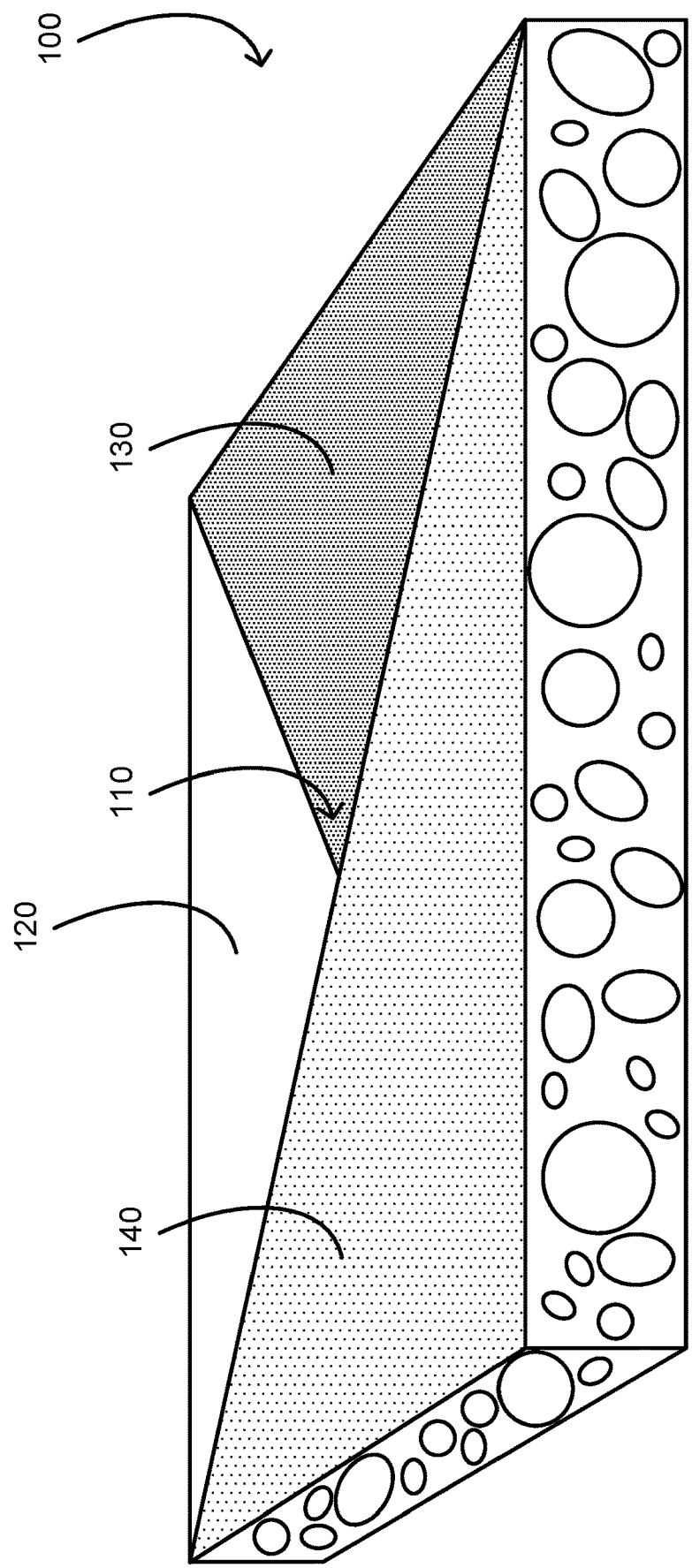

ENVIRONMENTALLY SAFE CONCRETE OR MORTAR ETCHING COMPOSITION AND METHODS THEREOF

PRIORITY

This application is a continuation-in-part of U.S. patent application Ser. No. 16/159,942, filed Oct. 15, 2018, titled "ENVIRONMENTALLY SAFE CONCRETE OR MORTAR ETCHING COMPOSITION AND METHODS THEREOF," which is a continuation-in-part of U.S. patent application Ser. No. 15/914,938, filed Mar. 7, 2018, also titled "ENVIRONMENTALLY SAFE CONCRETE OR MORTAR ETCHING COMPOSITION AND METHODS THEREOF," each of which is hereby incorporated by reference into this application in its entirety.

FIELD

Embodiments relate to an etching composition. More particularly, at least one embodiment relates to an environmentally safe etching composition used for etching hardened surfaces, such as concrete and mortar surfaces, and a method of use thereof.

BACKGROUND

For over a century, contractors around the globe have used the dangerous and environmentally toxic hydrochloric acid, or muriatic acid as it is commonly known, to etch Portland cement concrete surfaces, thereby exposing and cleaning any fine aggregate of the concrete matrix or select surface-seeded aggregates thereof. Muriatic acid is also used to clean efflorescence from cement-based grout in various forms of masonry. In addition, muriatic acid is prescribed by many manufacturers to clean and etch concrete surfaces prior to applying certain sealers, floor levelers, or various coatings.

Muriatic acid is the chemical primarily used by workers to perform all the aforementioned tasks. As such, there are many muriatic acid products and manufacturers thereof including, but not limited to, muriatic acid by Sunnyside Corporation (Wheeling, Ill.). Unfortunately, muriatic acid is also one of the most powerful and dangerous chemicals that can be purchased without a special permit. As such, there is no assurance that muriatic acid will be safely handled or its waste and byproducts properly disposed of at a toxic dump facility. Muriatic acid requires that the person performing the acid washing wear acid-safe eye protection, rubber gloves, and a long rubber apron. In addition, the person must wear a charcoal-filtered respirator to avoid serious lung and mucous lining damage.

Unfortunately, thousands of gallons of acidic, highly toxic, and corrosive muriatic acid runoff are released into the biosphere daily. This practice occurs around the globe creating environmental and human health hazards wherever muriatic acid is utilized by craftsmen, homeowners, or the like. In short, muriatic acid: causes environmental damage due to contamination by toxic and acidic runoff; kills plants and animals in both freshwater and saltwater; kills plants and animals on land; causes blindness if it comes in contact with eyes; causes severe acid burns if it comes in contact with skin; damages the mucous lining of the sinus system; damages the lining of the lungs; causes toxic clouds when applied in even subtle wind conditions; cannot be used indoors; and generates explosions when improperly mixed with water. Furthermore, after application of muriatic acid to concrete or masonry surfaces, runoff must be collected and disposed at government-approved hazardous material dump sites. A prudent and logical human being would never subject himself or the environment to the damages caused by the use of muriatic acid.

Given the growing urgency that society, as a whole, needs to protect our environment, there are extensive reasons why another chemical composition, besides muriatic acid, is needed. Some efforts include SafEtch® by Prosoco, Inc. (Lawrence, Kans.); ROCKSOLID™ Safe Etch Solution by Rust-Oleum®; Etch-A-Crete by Bone Dry Products (Kenosha, Wis.); Eco-Etch Pro™ by Eco Safety Products (Phoenix, Ariz.); Etch & Clean by Eagle I.F.P. Company (Nashville, Tenn.); or Cemtetch® by Watco Industrial Flooring (Vernon Hills, Ill.). However, until now, there has not been a comparable product to muriatic acid for etching concrete and mortar that is also environmentally safe. Disclosed herein are environmentally safe concrete or mortar etching compositions and methods thereof.

SUMMARY

Disclosed herein is an environmentally safe etching composition for a concrete or mortar surface including, in some embodiments, urea at no more than about 30% (w/v) urea, acetic acid at greater than about 10% (v/v) acetic acid, an anticorrosive agent, and a surfactant. The etching composition is an aqueous solution in which the greater the concentration of the acetic acid, the coarser the etching of the concrete or the mortar surface over a prescribed amount of time.

In some embodiments, further comprising a buffering agent. The buffering agent is sodium borate at no more than about 20% (w/v) sodium borate.

In some embodiments, the etching composition further includes a fragrance in an amount sufficient to provide the etching composition a pleasant or agreeable scent over the acetic acid.

In some embodiments, the fragrance is pine oil at no more than about 0.5% (v/v) pine oil.

In some embodiments, the anticorrosive agent is sodium metasilicate at no more than about 5% (w/v) sodium metasilicate.

In some embodiments, the surfactant functions as both a wetting agent and a detergent at no more than about 1% (w/v) surfactant.

In some embodiments, the etching composition includes at least about 10% (w/v) urea, no more than about 30% (v/v) acetic acid, no more than about 5% (w/v) sodium metasilicate as the anticorrosive agent, and no more than about 1% (w/v) surfactant, which surfactant functions as both a wetting agent and a detergent. This etching composition, when applied to the concrete or mortar surface, produces an approximately 100-grit etched surface when allowed to stand for the prescribed amount of time on the concrete or mortar surface at approximately 1 gallon of the etching composition per 300 square feet of the concrete or mortar surface, the prescribed amount of time can be about 5 minutes.

In some embodiments, the etching composition further includes sodium borate as a buffering agent and pine oil as a fragrance. The sodium borate is at no more than about 20% (w/v) sodium borate. The pine oil is at no more than about 0.05% (v/v) pine oil.

In some embodiments, the etching composition further includes a buffering agent. The etching composition includes about 15% (w/v) urea, about 16% (v/v) acetic acid, about 15% (w/v) sodium borate as the buffering agent, about 2.5%

(w/v) sodium metasilicate as the anticorrosive agent, and about 0.35% (w/v) surfactant, which surfactant functions as both a wetting agent and a detergent. This etching composition, when applied to the concrete or mortar surface, produces an approximately 220-grit etched surface when allowed to stand for the prescribed amount of time on the concrete or mortar surface at approximately 1 gallon of the etching composition per 300 square feet of the concrete or mortar surface. The prescribed amount of time can be about 5 minutes.

Also disclosed herein is an environmentally safe etching method for a concrete or mortar surface including, in some embodiments, obtaining an environmentally safe etching composition for the concrete or mortar surface; applying the etching composition to the concrete or mortar surface; allowing the etching composition to stand on the concrete or mortar surface for a prescribed amount of time; and washing the concrete or mortar surface with water to produce an etched surface of the concrete or mortar. The etching composition includes an aqueous solution of urea, acetic acid, a buffering agent, an anticorrosive agent, and a surfactant with no more than about 30% (w/v) urea and at least about 10% (v/v) acetic acid in the etching composition.

In some embodiments, the etching composition includes at least about 10% (w/v) urea, no more than about 30% (v/v) acetic acid, no more than about 20% (w/v) sodium borate as the buffering agent, no more than about 5% (w/v) sodium metasilicate as the anticorrosive agent, and no more than about 1% (w/v) surfactant.

In some embodiments, the etching composition includes about 15% (w/v) urea, about 16% (v/v) acetic acid, about 15% (w/v) sodium borate, about 2.5% (w/v) sodium metasilicate, and about 0.35% (w/v) surfactant.

In some embodiments, applying the etching composition to the concrete or mortar surface includes spraying the etching composition on the concrete or mortar surface with a garden-type sprayer.

In some embodiments, washing the concrete or mortar surface with water includes pressure washing the concrete or mortar surface with water at a pressure of about 2,000 psi or more to remove the etching composition and laitance from the concrete or mortar surface.

In some embodiments, the etching method further includes cleaning the concrete or mortar surface to remove any bulk lipophilic contamination from the concrete or mortar surface before applying the etching composition to the concrete or mortar surface. The surfactant of the etching composition functions as both a wetting agent and a detergent to remove any residual lipophilic contamination from the concrete or mortar surface.

In some embodiments, the etching method further includes masking a portion of the concrete or mortar surface before applying the etching composition in order to avoid etching the portion of the concrete or mortar surface with the etching composition; and unmasking the portion of the concrete or mortar surface after washing the concrete or mortar surface with water to yield an unetched portion of the concrete or mortar surface adjacent an etched portion of the concrete or mortar surface.

In some embodiments, the etching method further includes iterating a group of operations of the method including i) masking a same or different portion of the concrete or mortar surface; ii) applying the etching composition to the concrete or mortar surface; iii) allowing the etching composition to stand on the concrete or mortar surface for the prescribed amount of time; iv) washing the concrete or mortar surface with water; and v) unmasking the same or different portion of the concrete or mortar surface until a complex etched surface of the concrete or mortar is produced, the complex etched surface including at least two adjacent portions etched with as much as a 100-grit to 220-grit difference in grit sizes.

Also disclosed herein is an environmentally safe etching method for a concrete or mortar surface including, in some embodiments, diluting a stock solution of urea, acetic acid, an anticorrosive agent, and a surfactant with an amount of water to form an environmentally safe etching composition for the concrete or mortar surface; spraying the etching composition on the concrete or mortar surface with a garden-type sprayer; agitating the etching composition on the concrete or mortar surface; allowing the etching composition to stand on the concrete or mortar surface for a prescribed amount of time; and pressure washing the concrete or mortar surface with water to remove the etching composition and laitance from the concrete or mortar surface and produce an etched surface of the concrete or mortar. The etching composition includes an aqueous solution of urea, acetic acid, a buffering agent, an anticorrosive agent, and a surfactant that functions as a wetting agent, a detergent, or both a wetting agent and a detergent with no more than about 30% (w/v) urea and at least about 10% (v/v) acetic acid in the etching composition.

In some embodiments, the etching composition includes at least about 10% (w/v) urea, no more than about 30% (v/v) acetic acid, no more than about 20% (w/v) sodium borate as the buffering agent, no more than about 5% (w/v) sodium metasilicate as the anticorrosive agent, and no more than about 1% (w/v) surfactant.

In some embodiments, the etching composition includes about 15% (w/v) urea, about 16% (v/v) acetic acid, about 15% (w/v) sodium borate as the buffering agent, about 2.5% (w/v) sodium metasilicate, and about 0.35% (w/v) surfactant.

DRAWINGS

Embodiments are illustrated by way of example and not by way of limitation in the figures of the accompanying drawings, in which like references indicate similar elements and in which:

FIG. 1 provides a schematic illustrating a sample of concrete in which different portions of a surface of the sample of concrete have a discernable difference in grit sizes in accordance with some embodiments.

Figure 2A:
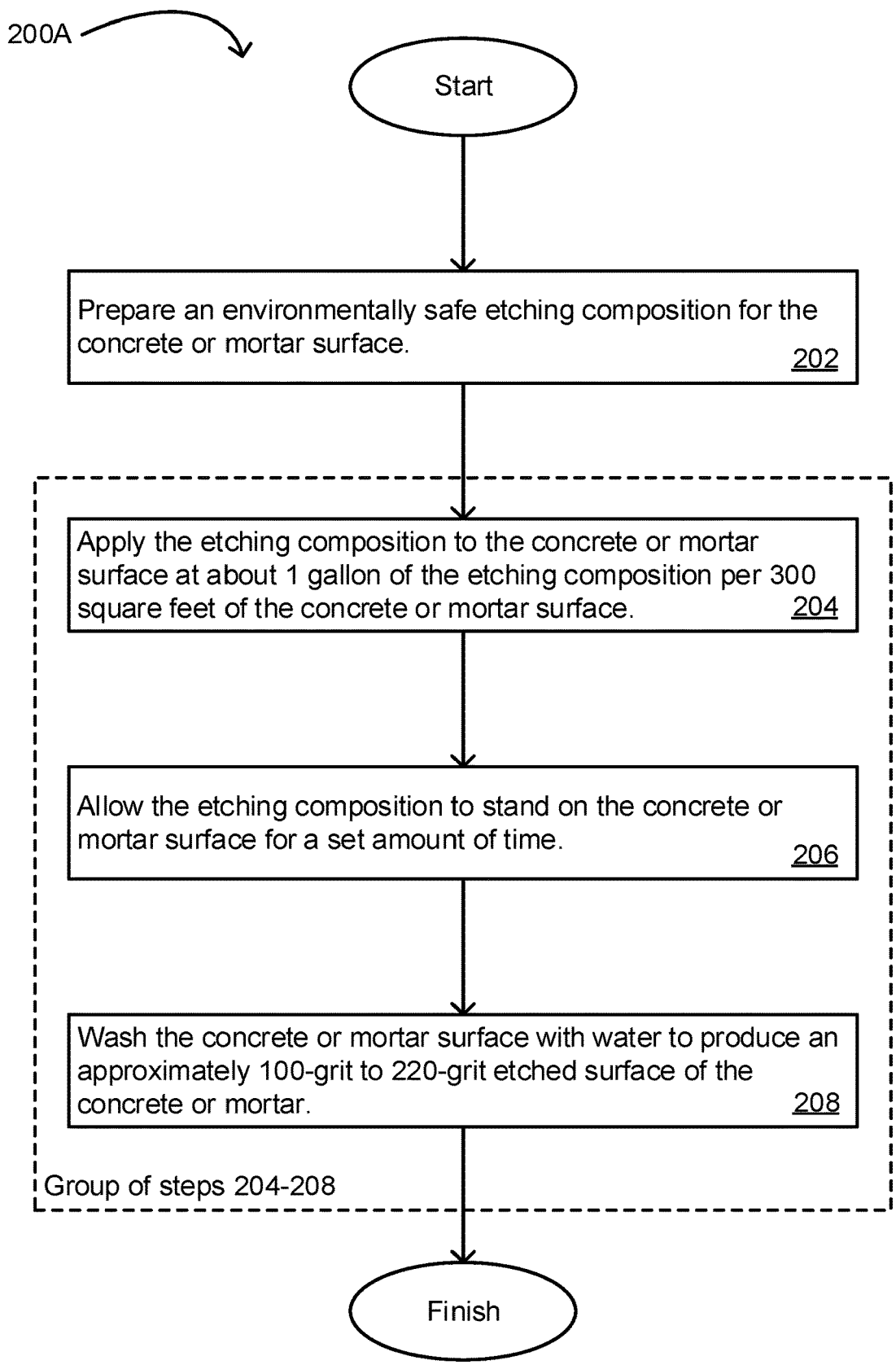

FIG. 2A provides a schematic illustrating an environmentally safe etching method for a concrete or mortar surface in accordance with some embodiments.

Figure 2B:
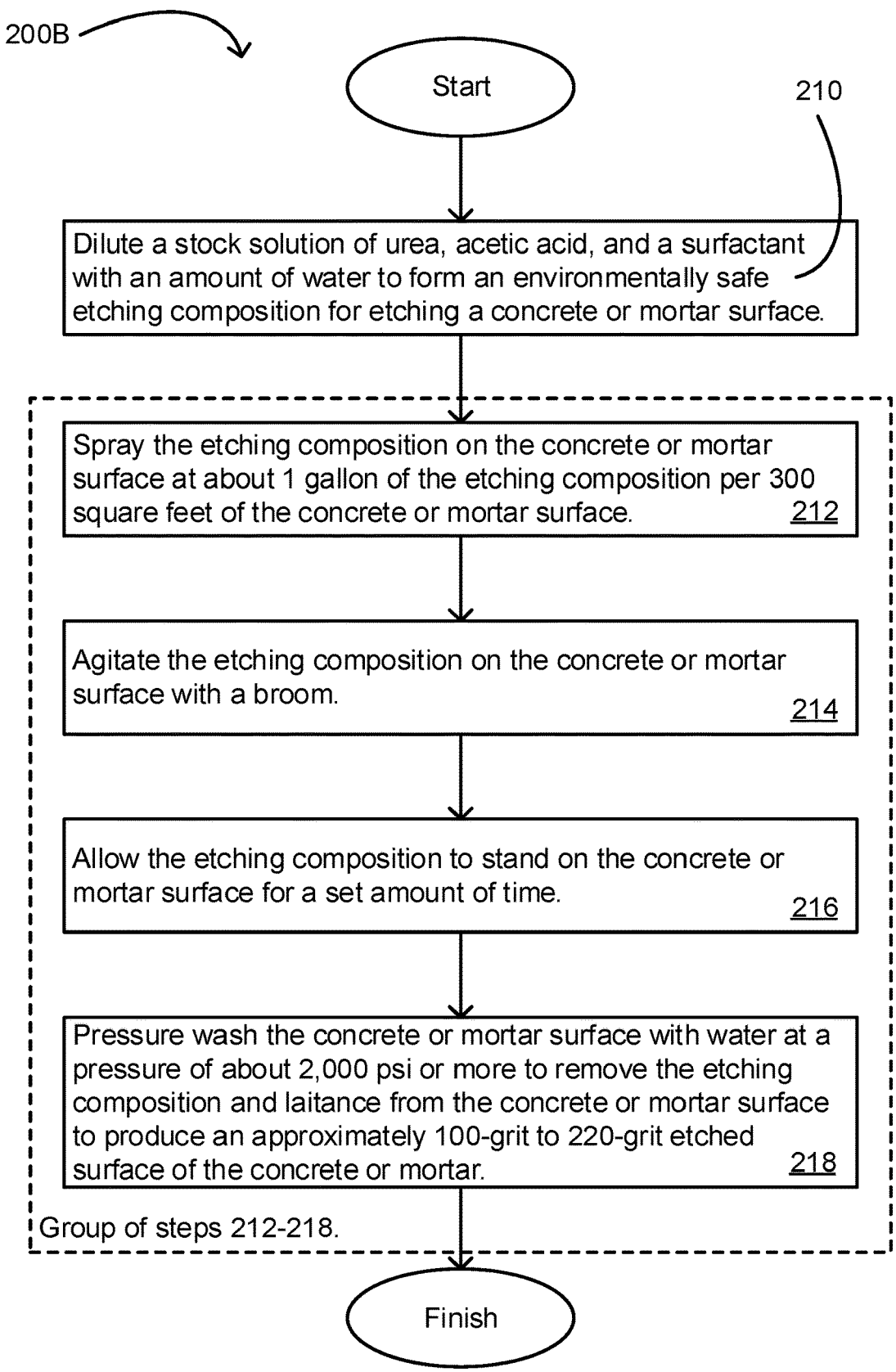

FIG. 2B provides a schematic illustrating an environmentally safe etching method for a concrete or mortar surface in accordance with some embodiments.

Figure 3:
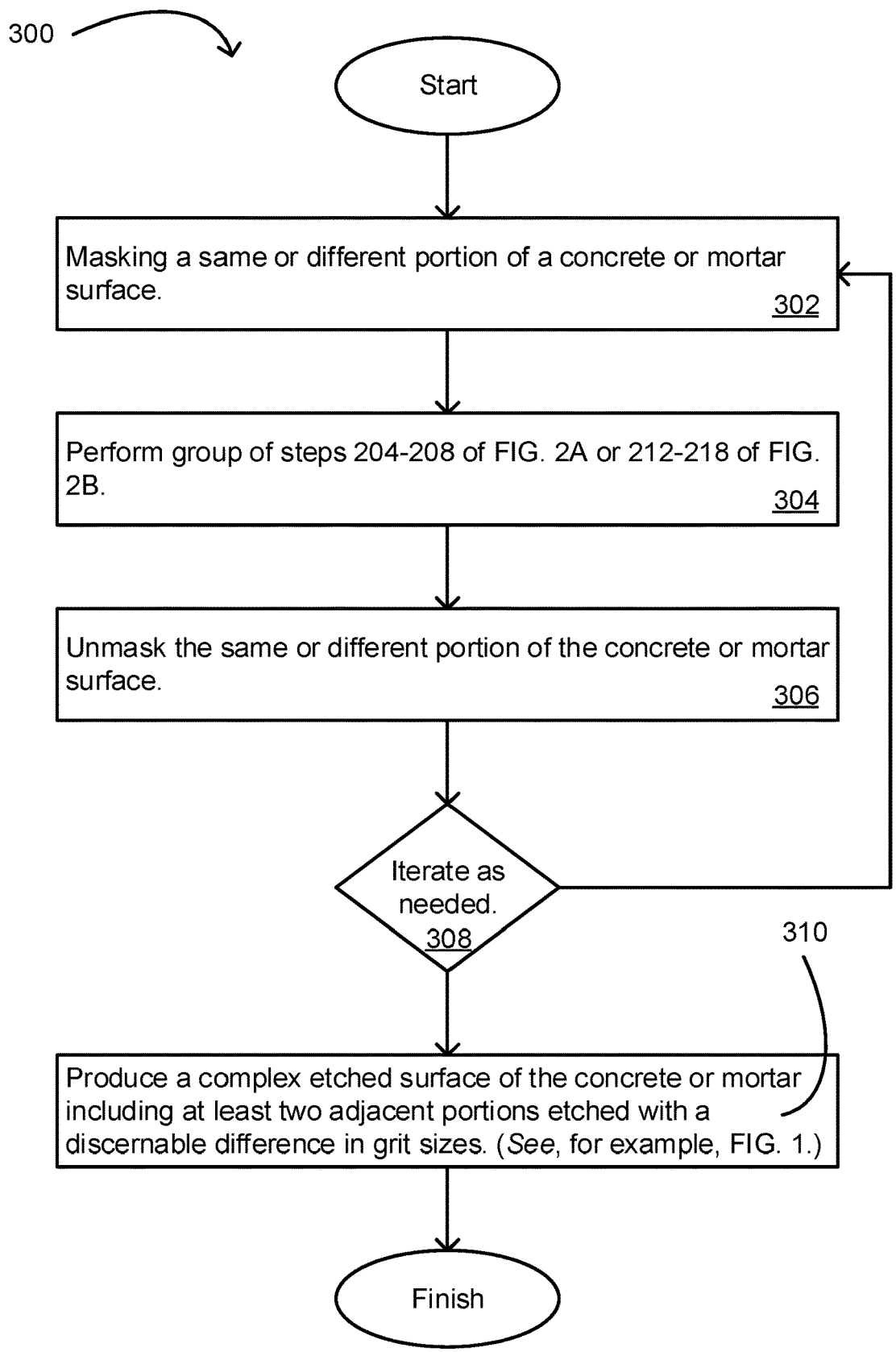

FIG. 3 provides a schematic illustrating an environmentally safe etching method for complex architectural finishes on concrete or mortar surfaces in accordance with some embodiments.

DESCRIPTION

Before some particular embodiments are disclosed in greater detail, it should be understood that the particular embodiments disclosed herein do not limit the scope of the concepts provided herein. It should also be understood that a particular embodiment disclosed herein can have features that can be readily separated from the particular embodiment and optionally combined with or substituted for features of any of a number of other embodiments disclosed herein.

Regarding terms used herein, it should also be understood the terms are for the purpose of describing some particular embodiments, and the terms do not limit the scope of the concepts provided herein. Ordinal numbers (e.g., first, second, third, etc.) are generally used to distinguish or identify different features or operations in a group of features or operations, and do not supply a serial or numerical limitation. For example, "first," "second," and "third" features or operations need not necessarily appear in that order, and the particular embodiments including such features or operations need not necessarily be limited to the three features or operations. Any labels such as "left," "right," "front," "back," "top," and "bottom," and the like are used for convenience and are not intended to imply, for example, any particular fixed location, orientation, or direction. Instead, such labels are used to reflect, for example, relative location, orientation, or directions. Singular forms of "a," "an," and "the" include plural references unless the context clearly dictates otherwise.

Solution concentrations are generally expressed herein in terms of percentage. For example, a concentration for a liquid solution can be expressed herein by percent solute in the solution, wherein the solute is measured by either volume or weight, and wherein the solution is also measured by either volume or weight. For example, an aqueous solution of 1% (v/v) acetic acid is 1 mL acetic acid in 100 mL of solution:

$$\frac{1 \text{ mL acetic acid}}{100 \text{ mL water}} \times 100 = 1\% \ (v/v) \text{ acetic acid in water}$$

Because the example aqueous solution of acetic acid is so dilute, the volume of solvent (e.g., 100 mL water) is used in place of the volume of solution in the foregoing concentration expression. This is because any change in volume of the solvent is expected to be negligible upon addition of the solute to form the solution. Indeed, the foregoing concentration expression is, theoretically, most appropriate for dilute solutions. That said, as a practical matter, the foregoing concentration expression is often used for more concentrated solutions as well, which includes some of the more concentrated solutions herein. In another example, an aqueous solution of 1% (w/v) urea is 1 g urea in 100 mL of solution:

$$\frac{1 \text{ g urea}}{100 \text{ mL water}} \times 100 = 1\% \ (w/v) \text{ urea in water}$$

As with the example aqueous solution of acetic acid, because any change in volume of the water is expected to be negligible upon addition of the urea to form such a dilute aqueous solution of 1% (w/v) urea, the volume of water is used in place of the volume of aqueous solution of urea in the foregoing concentration expression. Again, the foregoing concentration expression is, theoretically, most appropriate for dilute solutions. That said, as a practical matter, the foregoing concentration expression is often used for more concentrated solutions as well, which includes some of the more concentrated solutions herein. Furthermore, a percentage is generally a dimensionless number. That said, as a practical matter, the foregoing concentration expression is often used for percent solute by weight in a volume of the solution.

Unless defined otherwise, all technical and scientific terms used herein have the same meaning as commonly understood by those of ordinary skill in the art.

As set forth above, there has not been a comparable but environmentally safe alternative to muriatic acid for etching concrete and mortar until now. Disclosed herein are environmentally safe concrete or mortar etching compositions and methods thereof.

Etching Composition Embodiments

The etching composition includes an aqueous solution of at least two components: a nitrogenous compound and an organic acid. Preferably, the nitrogenous compound naturally occurs or at least biodegrades into one or more naturally occurring or environmentally safe compounds. One such example of a nitrogenous compound in line with the forgoing guidelines is urea, which can be synthetic urea sourced from an industrial producer (e.g., by way of the Bosch-Meiser urea process) or natural urea from animal urine. The source of the urea in the etching composition can be a salt such as urea hydrochloride. Likewise, the organic acid naturally occurs or at least biodegrades into one or more naturally occurring or environmentally safe compounds. One such example of an organic acid in line with the forgoing guidelines is acetic acid, which can be synthetic acetic acid sourced from an industrial producer (e.g., by way of methanol carbonylation, acetaldehyde oxidation, or ethylene oxidation) or by oxidative fermentation of alcoholic foodstuffs or anaerobic fermentation.

The etching composition can be sold in a ready-to-use formulation for purchase and immediate use by consumers, or the etching composition can be sold in a concentrated formulation for purchase and dilution for use by consumers. In etching compositions of urea and acetic acid, environmentally safe etching methods for concrete or mortar surfaces use an etching composition having no more than about 40% (w/v) of urea and at least about 2% (v/v) acetic acid. Concentration of the urea and concentration of the aqueous acetic acid in the etching composition can be in an inverse relationship with each other. That is, as the concentration of the urea decreases in the etching composition, the concentration of the acetic acid increases in the etching composition. In an example, an embodiment of the etching composition can be about 40% (w/v) of urea and at least about 2% (v/v) acetic acid, whereas, in another embodiment, the etching composition can be about 15% (w/v) of urea and at least about 16% (v/v) acetic acid, wherein the concentration of acetic acid eclipses the concentration of urea. However, the concentration of the urea and the concentration of the acetic acid need not be in such an inverse relationship.

With respect to the urea in the etching composition, the etching composition can include at least about 2% (w/v), 4% (w/v), 6% (w/v), 8% (w/v), 10% (w/v), 11% (w/v), 12% (w/v), 13% (w/v), 14% (w/v), 15% (w/v), 16% (w/v), 17% (w/v), 18% (w/v), 19% (w/v), 20% (w/v), 22% (w/v), 24% (w/v), 26% (w/v), 28% (w/v), 30% (w/v), 32% (w/v), 34% (w/v), 36% (w/v), 38% (w/v), 40% (w/v), or 50% (w/v) urea, or an intervening concentration thereof, in the aqueous solution forming the etching composition. Alternatively, the etching composition can include no more than about 50% (w/v), 40% (w/v), 38% (w/v), 36% (w/v), 34% (w/v), 32% (w/v), 30% (w/v), 28% (w/v), 26% (w/v), 24% (w/v), 22% (w/v), 20% (w/v), 19% (w/v), 18% (w/v), 17% (w/v), 16% (w/v), 15% (w/v), 14% (w/v), 13% (w/v), 12% (w/v), 11% (w/v), 10% (w/v), 8% (w/v), 6% (w/v), 4% (w/v), or 2%

(w/v) urea, or an intervening concentration thereof, in the aqueous solution forming the etching composition.

In view of the foregoing urea concentrations, the etching composition can include a urea concentration range of at least about 2% (w/v) and no more than about 50% (w/v) urea, which includes at least about 5% (w/v) and no more than about 30% (w/v) urea, such as at least about 10% (w/v) and no more than about 20% (w/v) urea, for example, at least about 14% (w/v) and no more than about 16% (w/v) urea (e.g., 15% (w/v) urea) in the aqueous solution forming the etching composition. It has been found that the greater the concentration of the urea, the finer the etching of the concrete or the mortar surface over a prescribed amount of time. As such, to effect different architectural finishes (e.g., different grit-size finishes) using a standardized, environmentally safe etching method for concrete or mortar surfaces, different concentrations of the urea in the aqueous solution forming the etching composition are used.

With respect to the acetic acid in the etching composition, the etching composition can include at least about 0.01% (v/v), 0.25% (v/v), 0.5% (v/v), 0.75% (v/v), 1% (v/v), 1.25% (v/v), 1.5% (v/v), 1.75% (v/v), 2% (v/v), 2.25% (v/v), 2.5% (v/v), 2.75% (v/v), 3% (v/v), 3.25% (v/v), 3.5% (v/v), 3.75% (v/v), 4% (v/v), 4.25% (v/v), 4.5% (v/v), 4.75% (v/v), 5% (v/v), 5.25% (v/v), 5.5% (v/v), 5.75% (v/v), 6% (v/v), 7% (v/v), 8% (v/v), 9% (v/v), 10% (v/v), 11% (v/v), 12% (v/v), 13% (v/v), 14% (v/v), 15% (v/v), 16% (v/v), 17% (v/v), 18% (v/v), 19% (v/v), 20% (v/v), 30% (v/v), 40% (v/v), 50% (v/v) acetic acid, or an intervening concentration thereof, in the aqueous solution forming the etching composition. Alternatively, the etching composition can include no more than about 50% (v/v), 40% (v/v), 30% (v/v), 20% (v/v), 19% (v/v), 18% (v/v), 17% (v/v), 16% (v/v), 15% (v/v), 14% (v/v), 13% (v/v), 12% (v/v), 11% (v/v), 10% (v/v), 9% (v/v), 8% (v/v), 7% (v/v), 6% (v/v), 5.75% (v/v), 5.5% (v/v), 5.25% (v/v), 5% (v/v), 4.75% (v/v), 4.5% (v/v), 4.25% (v/v), 4% (v/v), 3.75% (v/v), 3.5% (v/v), 3.25% (v/v), 3% (v/v), 2.75% (v/v), 2.5% (v/v), 2.25% (v/v), 2% (v/v), 1.75% (v/v), 1.5% (v/v), 1.25% (v/v), 1% (v/v), 0.75% (v/v), 0.5% (v/v), 0.25% (v/v), or 0.01% (v/v) acetic acid, or an intervening concentration thereof, in the aqueous solution forming the etching composition.

In view of the foregoing acetic acid concentrations, the etching composition can include an acetic acid concentration range of at least about 2% (v/v) and no more than about 50% (v/v) acetic acid, which includes at least about 5% (v/v) and no more than about 30% (v/v) acetic acid, such as at least about 10% (v/v) and no more than about 20% (v/v) acetic acid, for example, at least about 15% (v/v) and no more than about 17% (v/v) acetic acid (e.g., 16% (v/v) acetic acid) in the aqueous solution forming the etching composition.

While concentrations of acetic acid in the etching composition are generally disclosed herein in volume percent (e.g., 10% (v/v) acetic acid), it should be understood such concentrations can be alternatively interpreted as weight/volume percent (e.g., 10% (v/v) acetic acid), thereby extending the disclosure without burdening the disclosure. It should also be understood such an interpretation does not extend to the claims; that is, the concentration of acetic acid in the etching composition claimed as a volume percent should be construed as a volume percent. Likewise, the concentration of acetic acid in the etching composition claimed as a weight/volume percent should be construed as a weight/volume percent. This is because there can be up to a few percent (e.g., 5%) difference between volume percent and weight/volume percent for a nominal volume (e.g., 50 mL) and weight (e.g., 50 g) of acetic acid in the etching composition at higher concentrations of acetic acid in the etching composition (e.g., 50% (v/v) acetic acid and 50% (w/v) acetic acid).

Again, to effect different architectural finishes (e.g., different grit-size finishes) using a standardized, environmentally safe etching method for concrete or mortar surfaces, different concentrations of the urea in the aqueous solution forming the etching composition are used. The acetic acid concentration in the etching composition is adjusted as needed per the urea concentration in the etching composition. The concentration of the acetic acid and the concentration of the urea in the etching composition can be in an inverse relationship with each other. That is, as the concentration of the urea decreases in the etching composition, the concentration of the acetic acid increases in the etching composition, or as the concentration of the urea increases in the etching composition, the concentration of the acetic acid decreases in the etching composition.

Urea is an alternative to rock salt or calcium chloride for road de-icing. While not quite as effective as rock salt or calcium chloride, urea is nonetheless used as a deicer, for example, on airport runways and roadways because it does not have the corrosivity of rock salt or calcium chloride. In addition, urea is known to increase the pH and pKa of weak acids in solution, thereby making such solutions less acidic. (P. K. D. Gupta; S. P. Moulik. *J. Phys. Chem.* 1987, 91(22) 5826-5832.) Surprisingly, then, an aqueous solution of urea with a weak organic acid such as acetic acid added thereto in the concentrations set forth herein provides an etching composition of sufficient corrosivity to etch concrete or mortar surfaces within minutes.

The etching composition can further include one or more surfactants. Surfactants lower surface tension in liquids, or solutions containing such surfactants, and one or more states of matter such as between the aqueous solution forming the etching composition and a solid concrete or mortar surface. Such surfactants can function as wetting agents, detergents, emulsifiers, foaming agents, dispersants, or a combination thereof, each of which surfactants can include ionic (e.g., anionic, cationic, or zwitterionic) or nonionic species as defined by the hydrophilic heads of the surfactants. For example, a surfactant of the etching composition can function as a wetting agent (e.g., an ionic wetting agent or a non-ionic wetting agent), a detergent (e.g., an ionic detergent or a non-ionic detergent), or both a wetting agent and a detergent. Like the nitrogenous compound (e.g., urea) and the organic acid (e.g., acetic acid) of the etching composition, the one or more surfactants of the etching composition preferably naturally occur or at least biodegrade into one or more naturally occurring or environmentally safe compounds.

A surfactant of the etching composition that functions as a wetting agent reduces surface tension of the aqueous solution forming the etching composition but also makes the etching composition more effective in spreading over and penetrating concrete or mortar surfaces. In some embodiments, the etching composition further includes an ionic wetting agent or a nonionic wetting agent as the surfactant. Ionic wetting agents include, but are not limited to, quaternary ammonium salts or alkali salts such as alkali sulfonates, examples of the latter including the anionic wetting agents Ufaryl DL 85 and Ufaryl DL 90C (Unger Fabrikker AS, Fredrikstad, Norway). Nonionic wetting agents include, but are not limited to, alcohols such as alkoxylated alcohols (e.g., ethoxylated alcohols), an example of which includes Surfonic® JL-80X (Huntsman Petrochemical, The Woodlands, Tex.).

A surfactant of the etching composition that functions as a detergent also reduces surface tension of the aqueous solution forming the etching composition but also imparts cleaning properties to the etching composition. For example, the detergent can remove any residual lipophilic contamination (e.g., oil, grease, etc.) from a concrete or mortar surface remaining after cleaning the concrete or mortar surface to remove any bulk lipophilic contamination. In some embodiments, the etching composition further includes an ionic detergent or a nonionic detergent as the surfactant. Like ionic wetting agents, ionic detergents include, but are not limited to, alkali salts such as alkali sulfonates, examples of which include the foregoing Ufaryl DL 85 and Ufaryl DL 90C. Like nonionic wetting agents include, nonionic detergents include, but are not limited to, alcohols such as alkoxylated alcohols (e.g., ethoxylated alcohols). Phosphate detergents are excepted from the etching composition as such detergents can cause nutrient pollution leading to eutrophication and harmful algal blooms. That said, the etching composition can include zero-phosphate alternatives.

With respect to the one or more surfactants in the etching composition, the etching composition can include at least about 0.01% (w/v), 0.25% (w/v), 0.5% (w/v), 0.75% (w/v), 1% (w/v), 2% (w/v), 3% (w/v), 4% (w/v), 5% (w/v), 6% (w/v), 7% (w/v), 8% (w/v), 9% (w/v), or 10% (w/v), or an intervening concentration thereof, of each surfactant of the one or more surfactants or a combination thereof in the aqueous solution forming the etching composition. Alternatively, the etching composition can include no more than about 10% (w/v), 9% (w/v), 8% (w/v), 7% (w/v), 6% (w/v), 5% (w/v), 4% (w/v), 3% (w/v), 2% (w/v), 1% (w/v), 0.75% (w/v), 0.5% (w/v), 0.25% (w/v), or 0.01% (w/v), or an intervening concentration thereof, of each surfactant of the one or more surfactants or a combination thereof in the aqueous solution forming the etching composition.

In view of the foregoing surfactant concentrations, the etching composition can include a surfactant concentration range of at least about 0.01% (w/v) and no more than about 10% (w/v) surfactant, which includes at least about 0.01% (w/v) and no more than about 5% (w/v) surfactant, such as at least about 0.01% (w/v) and no more than about 1% (w/v) surfactant, for example, at least about 0.25% (w/v) and no more than 0.5% (w/v) surfactant (e.g., 0.35% (w/v) surfactant) for any given surfactant of the one or more surfactants or a combination thereof in the aqueous solution forming the etching composition.

The concentration of the surfactant is adjusted in accordance with at least the molecular weight and the function of each species of the one or more surfactants in the aqueous solution forming the etching composition. With respect to the molecular weight of each species of surfactant, for example, the greater the molecular weight of a particular surfactant, the greater the concentration by weight of the particular surfactant needed in the etching composition to achieve a same molarity in the etching composition as another surfactant having a smaller molecular weight. With respect to the function of each species of surfactant, for example, a particular surfactant that functions as a detergent might—depending upon molecular weight—need a greater concentration by weight of the particular surfactant than another surfactant that functions as a wetting agent. This is because the wetting agent is most effective below its critical micelle concentration ("CMC"), whereas the detergent is most effective above its CMC. Any two or more surfactants in the aqueous solution forming the etching composition can also affect each other with respect to their functions. Thus, the concentration of each surfactant in the etching composition is adjusted accordingly.

The etching composition can further include one or more anticorrosive agents. The one or more anticorrosive agents mitigate or prevent corrosion or rust of metal-based construction elements such as reinforcing steel (e.g., reinforcing steel bar, or "rebar," reinforcing steel mesh, etc.), joints (e.g., cold joints, expansion joints, slip dowels, etc.), or hardware used therein or therewith. The one or more anticorrosive agents also mitigate or prevent corrosion or rust of metal-containing building elements such as plinths, corbels, handrails, window frames, door frames, doors, or hardware (e.g., doorknobs, etc.) used therein or therewith. Such anticorrosive agents include, but are not limited to, metal metasilicates (e.g., alkali metal metasilicates, alkaline earth metal metasilicates, etc.) including sodium metasilicate, potassium metasilicate, or calcium metasilicate. Like the nitrogenous compound (e.g., urea) and the organic acid (e.g., acetic acid) of the etching composition, the one or more anticorrosive agents of the etching composition preferably naturally occur or at least degrade or biodegrade into one or more naturally occurring or environmentally safe compounds.

With respect to the one or more anticorrosive agents in the etching composition, the etching composition can include at least about 0.01% (w/v), 0.25% (w/v), 0.5% (w/v), 0.75% (w/v), 1% (w/v), 2% (w/v), 3% (w/v), 4% (w/v), 5% (w/v), 6% (w/v), 7% (w/v), 8% (w/v), 9% (w/v), or 10% (w/v), or an intervening concentration thereof, of each anticorrosive agent of the one or more anticorrosive agents or a combination thereof in the aqueous solution forming the etching composition. Alternatively, the etching composition can include no more than about 10% (w/v), 9% (w/v), 8% (w/v), 7% (w/v), 6% (w/v), 5% (w/v), 4% (w/v), 3% (w/v), 2% (w/v), 1% (w/v), 0.75% (w/v), 0.5% (w/v), 0.25% (w/v), or 0.01% (w/v), or an intervening concentration thereof, of each anticorrosive agent of the one or more anticorrosive agents or a combination thereof in the aqueous solution forming the etching composition.

In view of the foregoing anticorrosive agent concentrations, the etching composition can include an anticorrosive agent concentration range of at least about 0.01% (w/v) and no more than about 10% (w/v) anticorrosive agent, which includes at least about 0.5% (w/v) and no more than about 5% (w/v) anticorrosive agent, such as at least about 1% (w/v) and no more than about 3% (w/v) anticorrosive agent, for example, at least about 2% (w/v) and no more than about 3% (w/v) anticorrosive agent (e.g., 2.5% (w/v) anticorrosive agent) for any given anticorrosive agent of the one or more anticorrosive agents or a combination thereof in the aqueous solution forming the etching composition.

The concentration of the anticorrosive agent is adjusted in accordance with at least the molecular weight of each species of the one or more anticorrosive agents in the aqueous solution forming the etching composition. With respect to the molecular weight of each species of anticorrosive agent, for example, the greater the molecular weight of a particular anticorrosive agent, the greater the concentration by weight of the particular anticorrosive agent needed in the etching composition to achieve a same molarity in the etching composition as another anticorrosive agent having a smaller molecular weight. Any two or more anticorrosive agents in the aqueous solution forming the etching composition can also affect each other with respect to their anticorrosive function. Thus, the concentration of each anticorrosive agent in the etching composition is adjusted accordingly.

The etching composition can further include one or more buffering agents. The one or more buffering agents are useful for maintaining the etching composition around a particular pH. The one or more buffering agents include, but are not limited to, salts such as sodium borate. Sodium borate is advantageous in that it also functions as a water softener in the etching composition, thereby obviating water spots on a concrete or mortar surface subsequent to use of the etching composition thereon. In addition, sodium borate is advantageous in that it increases the viscosity of the etching composition, which facilitates maintaining the etching composition in place on a concrete or mortar surface.

With respect to the one or more buffering agents in the etching composition, the etching composition can include at least about 1% (w/v), 2% (w/v), 3% (w/v), 4% (w/v), 5% (w/v), 6% (w/v), 7% (w/v), 8% (w/v), 9% (w/v), 10% (w/v), 11% (w/v), 12% (w/v), 13% (w/v), 14% (w/v), 15% (w/v), 16% (w/v), 17% (w/v), 18% (w/v), 19% (w/v), 20% (w/v), 30% (w/v), or an intervening concentration thereof, of each buffering agent of the one or more buffering agents or a combination thereof in the aqueous solution forming the etching composition. Alternatively, the etching composition can include no more than about 30% (w/v), 20% (w/v), 19% (w/v), 18% (w/v), 17% (w/v), 16% (w/v), 15% (w/v), 14% (w/v), 13% (w/v), 12% (w/v), 11% (w/v), 10% (w/v), 9% (w/v), 8% (w/v), 7% (w/v), 6% (w/v), 5% (w/v), 4% (w/v), 3% (w/v), 2% (w/v), or 1% (w/v), or an intervening concentration thereof, of each buffering agent of the one or more buffering agents or a combination thereof in the aqueous solution forming the etching composition.

In view of the foregoing buffering agent concentrations, the etching composition can include a buffering agent concentration range of at least about 1% (w/v) and no more than about 30% (w/v) buffering agent, which includes at least about 5% (w/v) and no more than about 20% (w/v) buffering agent, such as at least about 10% (w/v) and no more than about 20% (w/v) buffering agent, for example, at least about 14% (w/v) and no more than about 16% (w/v) buffering agent (e.g., 15% (w/v) buffering agent) for any given buffering agent of the one or more buffering agents or a combination thereof in the aqueous solution forming the etching composition.

The concentration of the one or more buffering agents is adjusted as needed to maintain the etching composition around a particular pH. The concentration of the one or more buffering agents can vary in accordance with at least the concentration of acetic acid in the etching composition.

The etching composition can further include one or more fragrances. The one or more fragrances are useful for providing the etching composition a pleasant or agreeable scent. The one or more fragrances include, but are not limited to, pine oil, which primarily includes isomeric secondary and tertiary alcohols of cyclic terpenes produced by high-temperature distillation of oil of turpentine or by the catalytic hydration of pinenes. Pine oil is advantageous in that it also imparts cleaning properties to the etching composition. Like the detergent when present in the etching composition, the pine oil can remove any residual lipophilic contamination (e.g., oil, grease, etc.) from a concrete or mortar surface remaining after cleaning the concrete or mortar surface to remove any bulk lipophilic contamination.

With respect to the one or more fragrances in the etching composition, the etching composition can include at least about 0.01% (v/v), 0.25% (v/v), 0.5% (v/v), 0.75% (v/v), 1% (v/v), 2% (v/v), 3% (v/v), 4% (v/v), 5% (v/v), 6% (v/v), 7% (v/v), 8% (v/v), 9% (v/v), 10% (v/v), 11% (v/v), 12% (v/v), 13% (v/v), 14% (v/v), 15% (v/v), or an intervening concentration thereof, of each fragrance of the one or more fragrances or a combination thereof in the aqueous solution forming the etching composition. Alternatively, the etching composition can include no more than about 15% (v/v), 14% (v/v), 13% (v/v), 12% (v/v), 11% (v/v), 10% (v/v), 9% (v/v), 8% (v/v), 7% (v/v), 6% (v/v), 5% (v/v), 4% (v/v), 3% (v/v), 2% (v/v), or 1% (v/v), 0.75% (v/v), 0.5% (v/v), 0.25% (v/v), 0.01% (v/v) or an intervening concentration thereof, of each fragrance of the one or more fragrances or a combination thereof in the aqueous solution forming the etching composition.

In view of the foregoing fragrance concentrations, the etching composition can include a fragrance concentration range of at least about 0.01% (v/v) and no more than about 15% (v/v) fragrance, which includes at least about 0.01% (v/v) and no more than about 10% (v/v) fragrance, such as at least about 0.01% (v/v) and no more than about 5% (v/v) fragrance, for example, at least about 0.25% (v/v) and no more than about 1% (v/v) fragrance (e.g., 0.5% (v/v) fragrance) for any given fragrance of the one or more fragrances or a combination thereof in the aqueous solution forming the etching composition.

While concentrations of the one or more fragrances in the etching composition are generally disclosed herein in volume percent (e.g., 0.5% (v/v) pine oil), it should be understood such concentrations can be alternatively interpreted as weight/volume percent (e.g., 0.5% (v/v) pine oil), thereby extending the disclosure without burdening the disclosure. It should also be understood such an interpretation does not extend to the claims; that is, the concentration of the one or more fragrances in the etching composition claimed as a volume percent should be construed as a volume percent. Likewise, the concentration of the one or more fragrances in the etching composition claimed as a weight/volume percent should be construed as a weight/volume percent. Like that set forth above for the acetic acid in the etching composition, this is because there can be up to a few percent difference between volume percent and weight/volume percent for a nominal volume and weight of the one or more fragrances in the etching composition at higher concentrations of the one or more fragrances in the etching composition.

The concentration of the one or more fragrances is adjusted as needed to provide the etching composition a pleasant or agreeable scent. The concentration of the one or more fragrances can vary in accordance with at least the concentration of acetic acid in the etching composition, the acetic acid imparting a sour, vinegar-like smell at higher concentrations thereof in the etching composition.

With respect to the water in the etching composition, the water can make up the balance of the etching composition.

With respect to the pH of the etching composition, the etching composition can have a pH of at least about 5, 5.5, 6, 6.5, 6.6, 6.7, 6.8, 6.9, 7, 7.1, 7.2, 7.3, 7.4, 7.5, 8, 8.5, or 9, or an intervening pH thereof, in the ready-to-use formulation, the concentrated formulation, or the consumer-diluted formulation of the concentrated formulation. Alternatively, the etching composition can have a pH of no more than about 9, 8.5, 8, 7.5, 7.4, 7.3, 7.2, 7.1, 7, 6.9, 6.8, 6.7, 6.6, 6.5, 6, 5.5, or 5, or an intervening pH thereof, in the ready-to-use formulation, the concentrated formulation, or the consumer-diluted formulation of the concentrated formulation. In view of the foregoing pHs, the etching composition can have a pH of at least about 5 and no more than about 9, which includes a pH of at least about 6 and no more than about 8, such as a pH of at least about 6.5 and no more than about 7.5, for example, a pH of at least about 6.8 and no more than about 7.2 in the ready-to-use formulation, the concentrated formulation, or the consumer-diluted formulation of the concentrated formulation. The pH of the etching composition, which pH can remain about the same or the same during and after use of the etching composition contributes to the environmental friendliness of the etching composition.

The etching composition is used, inter alia, to effect different architectural finishes (e.g., different grit-size finishes) using a standardized, environmentally safe etching method for concrete or mortar surfaces. It has been found that the greater the concentration of the urea in the etching composition, the finer the etching of the concrete or the mortar surface over a prescribed amount of time. Table 1 shows different grit-size finishes for the etching composition with different concentrations of acetic acid when applied in accordance with the environmentally safe etching method set forth below at approximately 1 gallon of the etching composition per 300 square feet of concrete surface for the prescribed amount of time of about 5 minutes.

TABLE 1

Different grit-size finishes for the etching composition with different concentrations of acetic acid.

| Urea (wt %) | Acetic acid (vol %) | Grit-size finish (approx.) |
|---|---|---|
| 15 | 16 | 100 |
| 22 | 13 | 150 |
| 30 | 10 | 220 |

FIG. 1 provides a schematic illustrating a sample of concrete 100 in which different portions of a surface 110 of the sample of concrete 100 have a discernable difference in grit sizes in accordance with some embodiments. As shown, a first portion 120 of the surface 110 is unetched, a second portion 130 of the surface 110 is etched with a first grit size (e.g., a 220-grit finish by way of an etching solution of 30% urea by weight and 16% acetic acid by volume), and a third portion 130 of the surface 110 is etched with a second grit size (e.g., a 100-grit finish by way of an etching solution of 15% urea by weight and 16% acetic acid by volume). As set forth below, the environmentally safe etching method for concrete or mortar surfaces can be used with additional masking and unmasking operations in some embodiments to create complex architectural finishes having such discernable differences in grit sizes.

Etching Methods

FIG. 2A provides a schematic illustrating an environmentally safe etching method 200A for a concrete or mortar surface in accordance with some embodiments. As shown, the method 200A includes a number of operations for etching a concrete or mortar surface. However, not every operation of the method 200A is required nor does every operation need to be performed in the order presented. For example, the etching composition can be sold in a ready-to-use formulation for immediate use, thereby obviating any preparation operation.

In a first operation 202 of the method 200A, an environmentally safe etching composition for the concrete or mortar surface is prepared if not purchased as a ready-to-use formulation. Preparing the etching composition includes preparing an aqueous solution of no more than about 15% (w/v) urea, at least about 16% (v/v) acetic acid, about 15% (w/v) buffering agent, no more than about 2.5% (w/v) anticorrosive agent, and at least about 0.35% (w/v/) surfactant. Preparing the etching composition includes diluting a stock solution of the urea, the acetic acid, the buffer agent, the anticorrosive agent, and the surfactant with an amount of water to form the etching composition.

The stock solution for dilution can be prepared by dissolving urea in water (e.g., deionized water), followed by addition of aqueous acetic acid, then the buffering agent, and finally the addition of the anticorrosive agent and the surfactant. Concentrations of the urea, acetic acid, the buffering agent, the anticorrosive agent, and the surfactant in the stock solution are generally higher than in the etching composition for the purpose of diluting the stock solution to form the etching composition. That said, the ready-to-use formulation of the etching composition can be prepared in the same manner as the stock solution. For example, the etching composition can be prepared by dissolving urea in water (e.g., deionized water) up to no more than about 15% (w/v) urea, followed by addition of about 80% (v/v) aqueous acetic acid to at least about 16% (v/v) acetic acid, then the buffering agent to no more than about 10% (w/v) buffering agent, and finally addition of the anticorrosive agent to no more than about 2.5% (w/v) anticorrosive agent and the surfactant to no more than about 0.35% (w/v) surfactant.

In a second operation 204 of the method 200A, the etching composition is applied to the concrete or mortar surface. Applying the etching composition to the concrete or mortar surface includes spraying the etching composition on the concrete or mortar surface with a garden-type sprayer. Applying the etching composition further includes applying the etching composition to the concrete or mortar surface at approximately 1 gallon of the etching composition per 300 square feet of the concrete or mortar surface. However, depending upon characteristics of the concrete or mortar surface, more of the etching composition (e.g., 2 gallons) or less of the etching composition (e.g., 0.5 gallons) can be used over the same area of the concrete or mortar surface.

In an optional operation of the method 200A, the etching composition is agitated on the concrete or mortar surface with a broom. Agitating the etching composition on the concrete or mortar surface includes agitating the concrete or mortar surface with a medium to coarse broom (e.g., synthetic broom). Agitating the etching composition on the concrete or mortar surface can be before, during, or after allowing the etching composition to stand on the concrete or mortar surface in accordance with operation 206 of the method 200A.

In a third operation 206 of the method 200A, the etching composition is allowed to stand on the concrete or mortar surface for a prescribed amount of time. The prescribed amount of time can include at least about 1 minute, 5 minutes, 10 minutes, 30 minutes, or 60 minutes, or an intervening amount of time thereof. The prescribed amount of time can include no more than about 60 minutes, 30 minutes, 10 minutes, 5 minutes, or 1 minute, or an intervening amount of time thereof. In view of the foregoing, the prescribed amount of time can include at least about 1 minute and no more than about 60 minutes, which includes at least about 1 minute and no more than about 30 minutes, such as at least about 1 minute and no more than about 10 minutes, for example, at least about 1 minute and no more than about 5 minutes. Allowing the etching composition to stand on the concrete or mortar surface for the prescribed amount of time affords ample time for the etching kinetics without the concrete or mortar surface drying out. If the concrete or mortar surface is allowed to dry out, water or additional etching composition can be applied to the concrete or mortar surface and the method continued. However, applying additional etching composition can result in a lower grit size due to further etching.

In a fourth operation 208 of the method 200A, the concrete or mortar surface is washed. Washing the concrete or mortar surface includes washing the concrete or mortar surface with water to remove the etching composition and any laitance from the concrete or mortar surface. The concrete or mortar surface can be pressure washed with water at a pressure of about 2,000 psi or more without adverse effect. Subsequent to washing, an approximately 100-grit to 220-grit etched surface of the concrete or mortar is produced.

Following on the method 200A of FIG. 2A, FIG. 2B provides a schematic illustrating an environmentally safe etching method 200B for a concrete or mortar surface in accordance with some embodiments. As shown, the method 200B includes a number of operations for etching a concrete or mortar surface. However, not every operation of the method 200B is required nor does every operation need to be performed in the order presented. For example, the etching composition can be sold in a ready-to-use formulation for immediate use, thereby obviating any dilution operation. Furthermore, agitation of the etching composition on the concrete or mortar surface can be before (as shown), during, or after allowing the etching composition to stand on the concrete or mortar surface.

In a first operation 210 of the method 200B, a stock solution of urea, acetic acid, a buffering agent, an anticorrosive agent, and a surfactant is diluted with an amount of water to form an environmentally safe etching composition for etching a concrete or mortar surface. In a second operation 212 of the method 200B, the etching composition is sprayed on the concrete or mortar surface at approximately 1 gallon of the etching composition per 300 square feet of the concrete or mortar surface. In a third operation 214 of the method 200B, the etching composition is agitated on the concrete or mortar surface with a broom such as a medium to coarse synthetic broom. In a fourth operation 216 of the method 200B, the etching composition is allowed to stand on the concrete or mortar surface for a prescribed amount of time. In a fifth operation 218 of the method 200B, the concrete or mortar surface is pressure washed with water at a pressure of about 2,000 psi or more to remove the etching composition and laitance from the concrete or mortar surface to produce an approximately 100-grit to 220-grit etched surface of the concrete or mortar.

Following on the methods 200A and 200B of FIG. 2A and FIG. 2B, respectively, FIG. 3 provides a schematic illustrating an environmentally safe etching method for complex architectural finishes on concrete or mortar surfaces in accordance with some embodiments. FIG. 1 provides a schematic illustrating a sample of concrete with a complex architectural finish having discernable differences in grit sizes.

In a first operation 302 of the method 300, a portion of the concrete or mortar surface is masked to provide a masked portion of the concrete or mortar surface before applying the etching composition. This is to avoid etching the masked portion of the concrete or mortar surface with the etching composition In a second operation 304 of the method 300, a group of the operations 204, 206, and 208 of the method 200A or a group of the operations 212, 214, 216, and 218 of the method 200B are performed to produce an etched surface of the concrete or mortar in an unmasked portion of the concrete or mortar surface.

In a third operation 306 of the method 300, the masked portion of the concrete or mortar surface is unmasked after washing the concrete or mortar surface with water. This reveals an unetched portion of the concrete or mortar surface adjacent an etched portion of the concrete or mortar surface.

In an optional operation 308 of the method 300, the method 300 further includes iterating a group of the operations 302, 304, and 306 until a complex architectural finish of the concrete or mortar is produced. Iterating the group of operations 302, 304, and 306 includes i) masking a same or different portion of the concrete or mortar surface; ii) applying the etching composition to the concrete or mortar surface; iii) allowing the etching composition to stand on the concrete or mortar surface for the prescribed amount of time; iv) washing the concrete or mortar surface with water; and v) unmasking the same or different portion of the concrete or mortar surface.

In a final operation 310 of the method 300, the complex architectural finish of the concrete or mortar is produced. The complex architectural finish includes at least two adjacent portions of the concrete or mortar surface etched with a discernable difference in grit sizes. (See, for example, FIG. 1.)

While the etching composition set forth above has been described in terms of its capacity for etching concrete or mortar surfaces, the etching composition can also be used in a number of other ways. For example, the etching composition can also be used to clean concrete and mortar surfaces such as to remove efflorescence and other mineral deposits therefrom. In another example, the etching composition can also be used to clean ceramic surfaces such as toilets, sinks, and other ceramic plumbing fixtures to remove lime and calcium deposits.

Advantages

Advantages of the etching compositions and methods set forth herein include one or more of the following advantages:

No negative environmental impact

No harm to marine life or terrestrial life

Runoff does not have to be collected and deposited at hazardous waste sites

Runoff is safe for surface drains, as well as groundwater, oceans, lakes, rivers, estuaries, bays, and streams Runoff does not contaminate soil or planter areas but stimulates plant growth by way of the urea Feeds plankton in saltwater environments by way of the urea, thereby contributing to the ocean-based food chain Does not form toxic clouds, thereby allowing for indoor use with minimal ventilation Safe enough to use without a respirator under normal conditions Does not damage respiratory systems in any animals including humans Does not cause permanent eye damage While some particular embodiments have been disclosed herein, and while the particular embodiments have been disclosed in some detail, it is not the intention for the particular embodiments to limit the scope of the concepts provided herein. Additional adaptations and/or modifications can appear to those of ordinary skill in the art, and, in broader aspects, these adaptations and/or modifications are encompassed as well. Accordingly, departures may be made from the particular embodiments disclosed herein without departing from the scope of the concepts provided herein.

What is claimed is:

1. An environmentally safe etching composition for a concrete or mortar surface, comprising:
urea at no more than about 30% (w/v) urea;
acetic acid at greater than about 10% (v/v) acetic acid;

a buffering agent; and an agent for removing residual lipophilic contamination from the concrete or mortar surface;

wherein the etching composition is an acidic aqueous solution in which the greater the concentration of the acetic acid, the coarser the etching of the concrete or the mortar surface over a prescribed amount of time.

2. The etching composition of claim 1, wherein the buffering agent is sodium borate at no more than about 20% (w/v) sodium borate.

3. The etching composition of claim 1, wherein pine oil is the agent for removing the residual lipophilic contamination from the concrete or mortar surface.

4. The etching composition of claim 3, further comprising:

a fragrance in an amount sufficient to provide the etching composition a pleasant or agreeable scent over the acetic acid.

5. The etching composition of claim 4, wherein the fragrance is the pine oil at no more than about 0.5% (v/v) pine oil.

6. The etching composition of claim 3, wherein the agent for removing the residual lipophilic contamination from the concrete or mortar surface further includes a surfactant that functions as both a wetting agent and a detergent at no more than about 1% (w/v) surfactant.

7. The etching composition of claim 6, wherein:

the etching composition includes at least about 10% (w/v) urea and no more than about 30% (v/v) acetic acid, and the etching composition produces a 100-grit etched surface when allowed to stand for the prescribed amount of time on the concrete or mortar surface at one gallon of the etching composition per 300 square feet of the concrete or mortar surface, the prescribed amount of time being about five minutes.

8. The etching composition of claim 7, further comprising:

sodium borate as a buffering agent at no more than about 20% (w/v) sodium borate with the pine oil also as a fragrance at no more than about 0.5% (v/v) pine oil.

9. The etching composition of claim 6, wherein the detergent is an ionic detergent.

10. The etching composition of claim 6, wherein the detergent is a non-ionic detergent.

11. The etching composition of claim 1, wherein:

the etching composition includes about 15% (w/v) urea, about 16% (v/v) acetic acid, about 15% (w/v) sodium borate as the buffering agent, and a surfactant at about 0.35% (w/v) surfactant, the surfactant functions as both a wetting agent and a detergent, and the etching composition produces a 220-grit etched surface when allowed to stand for the prescribed amount of time on the concrete or mortar surface at one gallon of the etching composition per 300 square feet of the concrete or mortar surface, the prescribed amount of time being about five minutes.

12. The etching composition of claim 1, further comprising:

a fragrance in an amount sufficient to provide the etching composition a pleasant or agreeable scent over the acetic acid; and a surfactant, wherein the fragrance is pine oil, the surfactant functions as a detergent, and both the pine oil and the detergent function as the agent for removing the residual lipophilic contamination from the concrete or mortar surface.

13. The etching composition of claim 12, wherein the pine oil is at no more than about 0.5% (v/v) pine oil and the surfactant is at no more than about 1% (w/v) surfactant.

14. The etching composition of claim 13, wherein the etching composition includes at least about 10% (w/v) urea, no more than about 30% (v/v) acetic acid, and no more than about 20% (w/v) sodium borate as the buffering agent, the etching composition producing a 100-grit etched surface when allowed to stand for the prescribed amount of time on the concrete or mortar surface at one gallon of the etching composition per 300 square feet of the concrete or mortar surface, the prescribed amount of time being about five minutes.

15. The etching composition of claim 13, wherein the etching composition includes about 15% (w/v) urea, about 16% (v/v) acetic acid, about 15% (w/v) sodium borate as the buffering agent, and about 0.35% (w/v) surfactant, the etching composition producing a 220-grit etched surface when allowed to stand for the prescribed amount of time on the concrete or mortar surface at one gallon of the etching composition per 300 square feet of the concrete or mortar surface, the prescribed amount of time being about five minutes.

* * * * *